United States Patent [19]

de Putter

[11] 4,112,795
[45] Sep. 12, 1978

[54] PROCESS FOR PERFORATING PLASTICS TUBES

[75] Inventor: Warner Jan de Putter, Hardenberg, Netherlands

[73] Assignee: Wavin B.V., Zwolle, Netherlands

[21] Appl. No.: 859,159

[22] Filed: Dec. 9, 1977

Related U.S. Application Data

[63] Continuation of Ser. No. 664,939, Mar. 8, 1976, abandoned.

[51] Int. Cl.² .............................................. B23B 39/20
[52] U.S. Cl. ........................................... 83/15; 83/22; 83/54; 83/169; 83/170; 425/71; 425/290; 425/526; 425/445
[58] Field of Search ...................... 83/54, 15, 660, 170, 83/22, 169; 425/71, 307, 105, 308, 445, 290, 526, 527

[56] References Cited

U.S. PATENT DOCUMENTS 3,910,713  10/1975  Maroschak .......................... 83/15 X

*Primary Examiner*—Donald R. Schran
*Attorney, Agent, or Firm*—Watson, Cole, Grindle & Watson

[57] ABSTRACT

A process for perforating plastic tubes, in particular thin-walled corrugated tubes, by a punching or cutting operation wherein the plastic tubes are subjected to a direct or indirect treatment by a cooling fluid prior to the punching and cutting operation. The process is performed by an apparatus comprising a guide structure and conveying device for conveying the plastic tubes, and further comprising punching or cutting members, while spraying devices are provided for effecting the above-mentioned cooling treatment.

5 Claims, 3 Drawing Figures

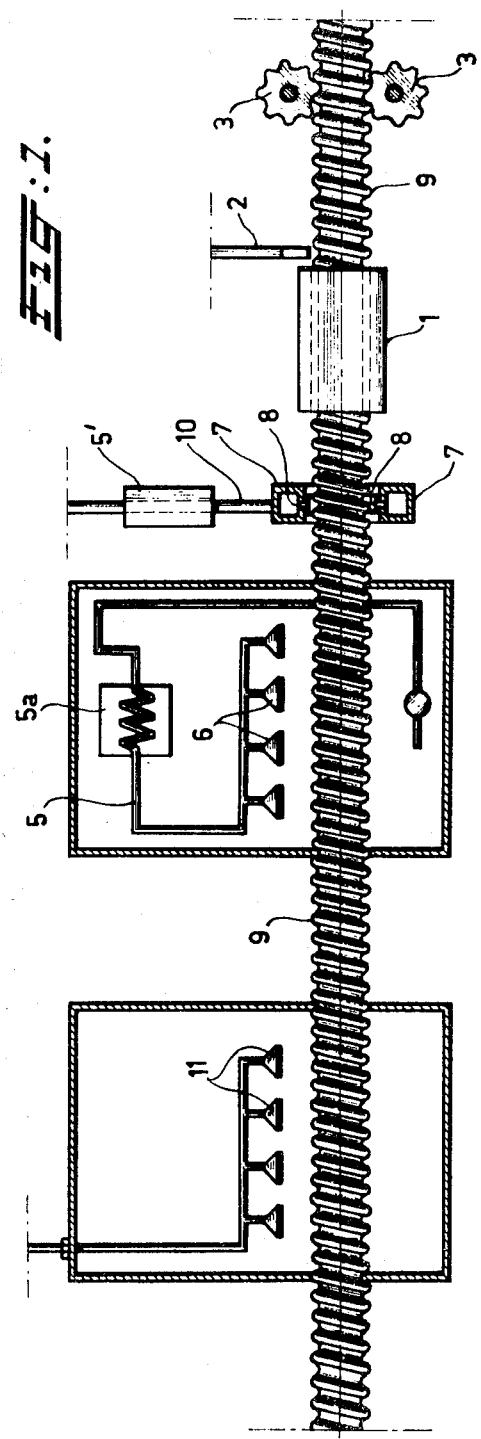

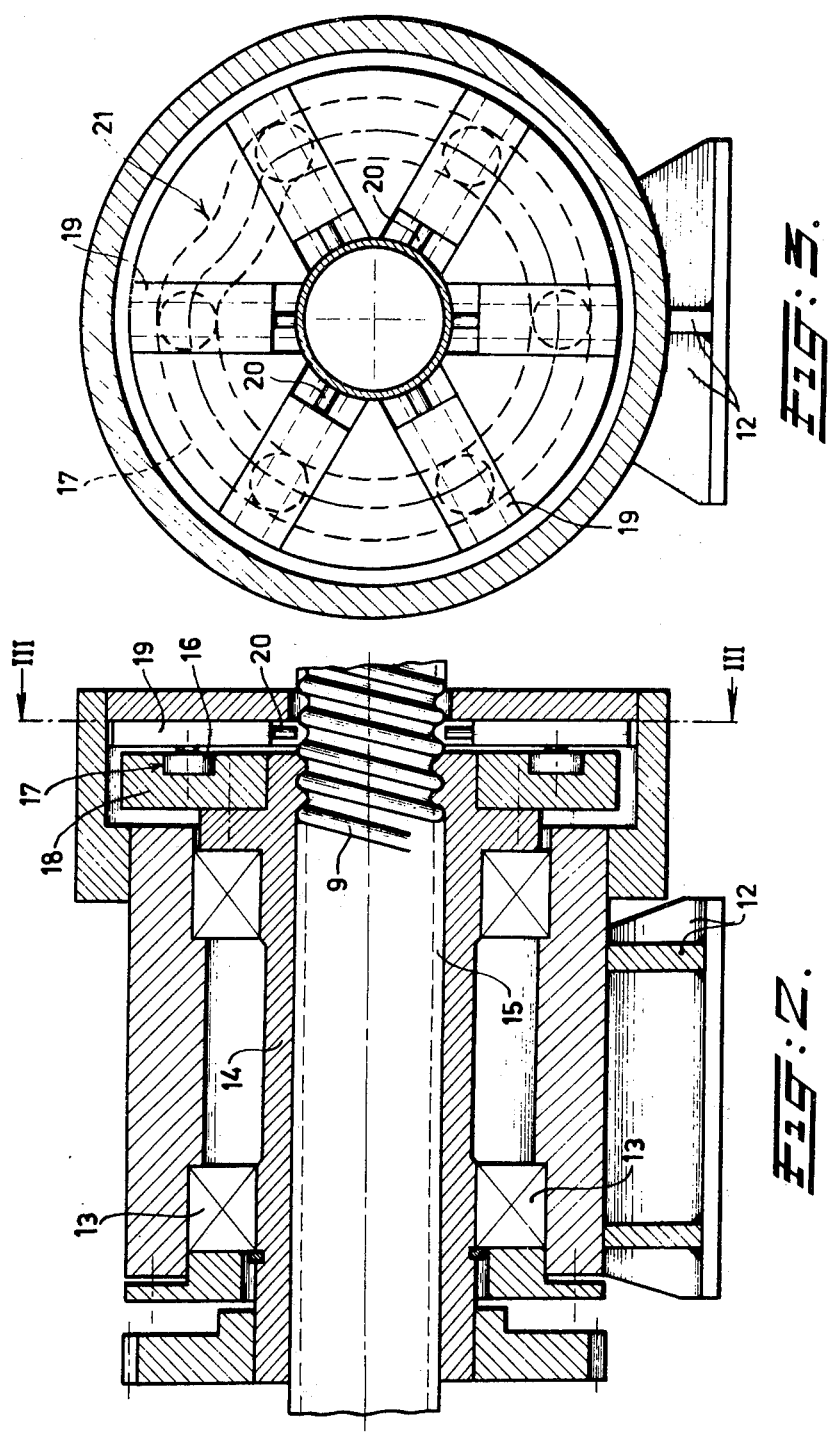

PROCESS FOR PERFORATING PLASTICS TUBES

This is a continuation of application Ser. No. 664,939 filed Mar. 8, 1976, now abandoned.

BACKGROUND OF THE INVENTION

1. Field of the Invention

The present invention relates to a process for perforating plastic tubes, in particular thin-walled corrugated tubes, by means of a punching or cutting operation.

2. Description of the Prior Art

A process for perforating thinwalled polyvinylchloride tubes, whereby the produced tubes are used for drainage or irrigation in the agricultural sector, is known per se. In this known process, perforating thin-walled tubes by means of cutting or punching is effected without the presence of any supporting means inside the plastic tubes.

The known process lends itself very well to operating on thin-walled polyvinylchloride tubes with a high modulus of elasticity. Great disadvantages present themselves, however, when a thin-walled plastic tube having a low modulus of elasticity, like a polyolefinic tube, has to be perforated, as the elasticial properties of such a tube prevents a proper perforation by means of punching or cutting. The latter properties of polyolefinic material cause the material to give with the punching members; thus, no perforation of the plastic material will be effected. This disadvantage particularly occurs when the desired perforations have to be made very quickly in the recesses of corrugated tubes by means of a punching or cutting operation. Though in that case the punching members do operate upon the plastic tubes, their operation is in vain, since they do not perforate the material so that no perforations are obtained at all.

3. Summary of the Invention

The present invention aims to provide a process in which the above-mentioned disadvantages are obviated and nearly alleviated. This process is performed so that thin-walled plastics tubes having a low modulus of elasticity can be perforated rapidly by subjecting the plastic tubes to a punching or cutting operation.

This result is achieved by subjecting plastic tubes with a low modulus of elasticity, prior to punching them, to a direct or or indirect treatment of a cooling fluid.

Because of this treatment, plastic tubes with a low modulus of elasticity, e.g., even when the tubes have a minor wall thickness, can be given a greater rigidity. Thus the tube material will not give with the punching or cutting members, so that the desired perforations in thin-walled plastic tubes can be punched or cut very rapidly, whether or not supporting means are present inside the tubes at the point where the punching operation takes place, that is, the punching or cutting members will no longer only move with the tube material without perforating the same.

The plastic tubes are conveniently made of a polyolefinic material, that is, preferably a polyethylene or a polypropylene material.

A very effective cooling effect of the plastic tubes is realized by spraying the tubes with a cooling liquid, preferably cooled water with a temperature ranging from about 0° to 5° C.

Any desired increase in the rigidity of the plastic tubes to be perforated can also be realized by cooling them with cooled air. An advantage of this medium over water is that air can be cooled to temperatures lower than 0° C.

The process according to my invention has the greatest possible effectiveness when the tubes to be perforated are cooled firstly by spraying them with water having a temperature ranging from 0° to 5° C., while subsequently cooled air is blown upon the plastic tubes. A consequence of this treatment is that the moisture upon the outside of the tubes will be removed for the greater part, and vaporization of water will cause an accelerated cooling result. It goes without saying that in this case, dry air should be used for the blowing operation.

As described in the foregoing paragraph, thin-walled plastic tubes can be rapidly perforated by punching or cutting, and in particular punching, without any supporting means being present inside the tubes.

Perforated plastic tubes with a low modulus of elasticity, obtained by performing the process according to my invention, can be conveniently used for drainage purposes, especially in regions where low temperatures predominate. As a rule, known thin-walled polyvinylchloride tubes become brittle at low temperatures so that they are apt to break or split, even with minor vibrations.

The present invention relates also to an apparatus for perforating plastic tubes, in particular thin-walled, corrugated tubes, and comprises conveying members for conveying a plastic tube and guide means for guiding the same, as well as punching or cutting members. The apparatus is further provided with cooling members for cooling the plastic tubes to be perforated.

The apparatus conveniently includes a supporting member for supporting the plastic tubes at their outside surfaces at the point where the punching or cutting members will operate.

The cooling members are constructed effectively as a first cooling aggregate for cooling a liquid and a liquid circuit connected with nozzles which are operative in the conveying region of the plastic tubes.

BRIEF DESCRIPTION OF THE DRAWING

FIG. 1 shows an apparatus for perforating thin-walled plastic tubes according to the present invention.

FIG. 2 represents a longitudinal section of a punching device according to the present invention.

FIG. 3 shows a section of such a punching device according to line III—III of FIG. 2.

DESCRIPTION OF PREFERRED EMBODIMENTS

FIG. 1 diagrammatically shows an apparatus according to the present invention comprising a guide sleeve 1, a punching member 2 and a conveying member 3 for conveying the plastic tube to be perforated.

A liquid circuit 5 is connected with nozzles 6, which debouch into the conveying area of the plastic tube to be perforated; this circuit can be cooled by a cooling aggregate 5a.

The nozzles 6 serve for spraying cooled liquid, particularly water, on the plastic corrugated tube 9. Between these nozzles 6 an annular device 7 with apertures 8 is accommodated, through which cooled air with a temperature of 4° C. can be blown upon the plastic tube 9. This cooled air is supplied via a supply duct 10, which is cooled on its turn and which passes a second cooling aggregate 5'.

Beyond (upstream) nozzles 6, spraying a cooling liquid having a temperature of 5° C., a second series of nozzles 11 may be provided. These nozzles 11 can spray, e.g., ground water upon the plastics tubes for precooling them.

Though the punching devices to be used may vary, preferably a punching device which can operate without any supporting means inside the tube is utilized.

Such a punching device is shown in FIGS. 2 and 3, and comprises a frame 12, supporting an annular guide path means 14, the latter being stationary owing to bearings 13.

When using a helically corrugated plastic tube 9, sleeve 14 has an identical inside profile 15 causing the tube to be conveyed upon rotation of sleeve 14 along plastic tube 9. The tube is simultaneously perforated by a punching operation, performed by means of a punching chisel 20. Sleeve 14 is provided with a disc 18 comprising a non-circular cam path 17, in which a projecting part 16 can operate, which is connected to a stationary punching member 8'.

Disc 18 will rotate together with sleeve 14, so that part 16 lands in cam path 17. This path being non-circular, punching member 19 is pressed into the area of part 21 (which is non-circular also), causing the wall of plastic tube 9 to be perforated in the desired manner. Punching member 19 with its punching nipple or chisel 20 operates in this case in an area substantially located beside the head face of sleeve 14.

In the shown embodiment, sleeve 14 serves simultaneously as a conveying member for the plastic tube 9. It will be clear, however, that a sleeve 14 can be used, which does not have an inside identical profile. Conveyance will in that case be performed by, for instance, gearing wheels 3.

Naturally any punching or cutting device known per se can be used in the invention, in order to obtain the desired perforations.

What I claim is:

1. In a process for perforating a thin-walled corrugated tube composed of a polyolefinic material by means of a punching or cutting operation, the improvement wherein prior to the punching or cutting operation the tube is sequentially
    (1) contacted with a liquid spray which is at a temperature of between about 0° to 5° C., and
    (2) contacted with a stream of air at a temperature less than the temperature of the water spray of step (1).
2. The process of claim 1, wherein said liquid spray in step (1) is a water spray.
3. The process of claim 1, wherein the tube is composed of a polyolefinic material selected from the group consisting of polyethylene and polypropylene.
4. The process of claim 1, wherein the air of step (2) is at a temperature of up to 4° C.
5. The process of claim 4, wherein the air of step (2) is at a temperature of up to 0° C.

* * * * *